United States Patent
Ek et al.

(10) Patent No.: US 7,399,138 B2
(45) Date of Patent: Jul. 15, 2008

(54) ROAD RESTRAINT SYSTEM PARTS

(75) Inventors: Carl-Gustaf Ek, Frölunda (SE); Tony Lindström, Bletret (SE); Cecilia Rydin, Ödsmal (SE); Svein Jamtvedt, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/399,524

(22) PCT Filed: May 22, 2001

(86) PCT No.: PCT/EP01/05897

§ 371 (c)(1),
(2), (4) Date: Jul. 14, 2003

(87) PCT Pub. No.: WO02/35008

PCT Pub. Date: May 2, 2002

(65) Prior Publication Data

US 2004/0037642 A1    Feb. 26, 2004

(30) Foreign Application Priority Data

Oct. 23, 2000    (EP) .................... 00123000

(51) Int. Cl.
*E01F 9/017*    (2006.01)

(52) U.S. Cl. ..................... 404/10; 40/607.01

(58) Field of Classification Search ............... 428/34.1, 428/34.7, 35.7, 36.91, 480; 404/6, 9, 10; 256/13.1, 1; 138/137; 40/607.01, 608
See application file for complete search history.

(56) References Cited

U.S. PATENT DOCUMENTS

| | | | | |
|---|---|---|---|---|
| 4,078,867 A * | 3/1978 | Ronden | ........................ | 404/10 |
| 4,420,582 A * | 12/1983 | Canard et al. | ............... | 524/450 |
| 4,877,224 A * | 10/1989 | Watts | ........................ | 267/140 |
| 5,219,241 A * | 6/1993 | Picton | ........................... | 404/6 |
| 5,374,137 A * | 12/1994 | Steinberg | ....................... | 404/9 |
| 5,507,473 A * | 4/1996 | Hammer et al. | ............. | 256/13.1 |
| 5,574,111 A * | 11/1996 | Brichta et al. | ............... | 525/313 |
| 6,010,275 A * | 1/2000 | Fitch | ............................ | 404/6 |
| 6,015,954 A * | 1/2000 | Hochuli et al. | .......... | 174/110 R |
| 6,028,145 A * | 2/2000 | Niebergall et al. | .......... | 525/240 |
| 6,187,402 B1 * | 2/2001 | Ek et al. | .................. | 428/36.91 |
| 6,220,576 B1 * | 4/2001 | Chan | .......................... | 256/13.1 |
| 6,221,962 B1 * | 4/2001 | Heino et al. | ................ | 525/133 |
| 6,340,268 B1 * | 1/2002 | Alberson et al. | ............... | 404/6 |
| 6,637,971 B1 * | 10/2003 | Carney et al. | ................. | 404/6 |

FOREIGN PATENT DOCUMENTS

JP    2000-136513    *    5/2000

* cited by examiner

*Primary Examiner*—Gary S Hartmann
(74) *Attorney, Agent, or Firm*—Fay Sharpe LLP

(57) ABSTRACT

A road restraint system part is made of polyolefin material having an energy absorption of at least 10 kJ/m2 at +23° C. and at least 5 kJ/m2 at −20° C. (determined according to ISO 179/1eA with notched specimens).

22 Claims, 1 Drawing Sheet

ROAD RESTRAINT SYSTEM PARTS

BACKGROUND

The invention relates to road restraint system parts, in particular poles for road safety barriers.

Various types of road safety barriers have been developed. One such type comprises horizontally disposed rails mounted on spaced-apart poles let into the ground.

Conventional poles for road safety barriers are normally made of steel, aluminium, wood, concrete, or natural stone. These materials are expensive due to the material costs, their installation, transport, and repairing costs. In addition, wooden poles can form dangerous sharp broken pieces which in the event of a collision may flung around in the area of the accident so that they constitute a danger in themselves. Above that, sharp pieces of wooden poles can penetrate the car body and create an additional risk for passengers. Since wooden poles are impregnated with toxic chemicals to provide better weather resistance and rot protection, they also cause environmental concerns. For instance in Norway an additional fee has to be paid upon of these toxically impregnated poles.

Since it is the purpose of road safety barriers to prevent a vehicle which goes out of control from driving into the roadside ditch, down a slope, over a drop, or into a lane with traffic in the opposite direction, it is important that these barriers are able to withstand the force in order to keep the vehicles on the road. Thus, a high energy absorption of the poles is one of the crucial factors of road safety barriers. However, wooden poles are rigid and poles made of concrete and stone are rigid and brittle. Thus, when the conventional poles break the energy absorption will mainly be taken case of by the vehicle giving also large damages on the vehicle and the driver/passenger. Poles of galvanised steel and zinc may leak out, especially since the poles are in direct contact with the soil. When steel poles are bent to the ground they are not more active in the energy absorbing process due to their plastic behaviour. Plastic poles are acting more as an elastic object which is recovering to its original position when the load is not active, i.e. the same poles are ready for absorbing additional energy, also during the same collision event due to the whole system of poles and guard rails.

To overcome at least some of the drawbacks of conventional poles, the use of plastic poles for road safety barriers has been proposed. For instance, U.S. Pat. No. 5,507,473 discloses a pole for a road safety barrier comprising a metal pipe with lugs embedded into a plastic material consisting of a blend of high-density polyethylene and low-density polyethylene to give the necessary temperature stability. U.S. Pat. No. 5,660,375 discloses a multi-layer pole of polyester veils and fibreglass nets filled with recycled plastic. U.S. Pat. No. 5,152,507 proposes a pole consisting of a rod of fibre-reinforced plastic filled with foamed plastic which is inserted into a pipe of fibre-reinforced plastic embedded into concrete. Compared to conventional poles as of wood, for instance, these poles are much too expensive.

In addition, poles for road safety barriers are known as being one-piece moldings of plastic material such as a mixture of high- or low-density polyethylene or polypropylene (U.S. Pat. No. 5,219,241) or a hollow plastic pipe (WO99/61708). However, these poles bend upon collision with a car. To overcome this problem, WO99/61708 suggests a specific system for fastening the guard rail to the poles which leads the car back to the road when the poles are bent, i.e. WO99/61708 is utilising the bending for energy absorption.

Since it is a well known property of poles made of plastic such as polyethylene to bend easily, poles of plastic are also widely used as traffic guide poles (CH-A-471940, CH-A-546862, DE-C-2649911).

Because of their unsatisfactory energy absorption, the prior art poles made of plastic fail when a vehicle crashes at high speed into the safety barrier, particularly under cold climate-conditions. Under these conditions, plastic becomes brittle and will practically make no contribution to the energy absorption badly needed. In addition, loose parts of the safety barrier as well as remaining sharp pieces of the poles may injure the involved people in such an accident.

SUMMARY

It is an objective of the invention to provide road restraint system parts which show a safety margin to the impact behaviour and have a high energy-absorbing ability also at high impact speed and/or sub-zero temperature levels. In particular a pole for road safety barriers which when hit at usual cruising speed does neither break nor bend in order to keep the vehicle on the road, nor cause injuries to the passenger or severe damages on the vehicle also at high impact speed and/or sub-zero temperature levels.

With reference to FIG. 1, according to one aspect of the invention, there are provided road restraint system parts, in particular poles 1 for road safety barriers being made of polyolefin plastic having an energy absorption at +23° C. of 10 kJ/m$^2$, more preferably 15 kJ/m$^2$, even more preferably 20 kJ/m$^2$ and most preferably 25 kJ/m$^2$, and at least 5 kJ/M$^2$, preferably 7 kJ/m$^2$, more preferably 10 kJ/m$^2$ and most preferably 12 kJ/m$^2$ at −20° C.

DETAILED DESCRIPTION

Figure 1:
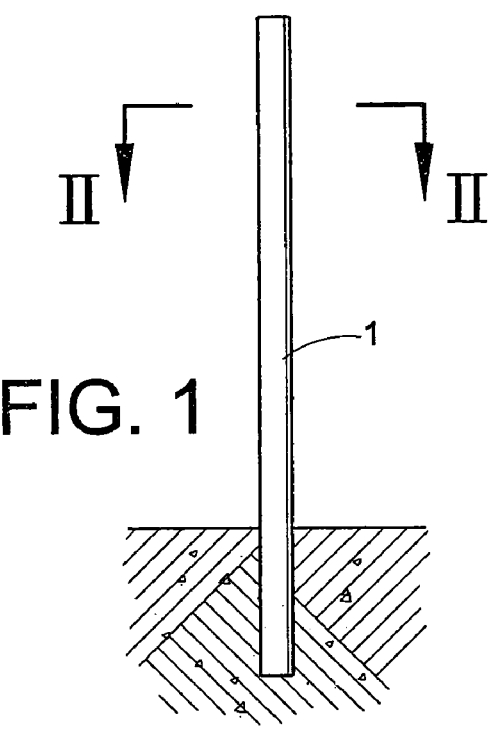
FIG. 1 is a side view of a road pole.

This energy absorption values are determined by utilising Charpy impact values of notched samples according to ISO 179/1eA.

In addition, the Izod impact strength with unnotched samples was determined according to ISO 180/1U. The energy absorption values of the pole according to the invention according to ISO 180/1U with unnotched samples are preferably at least 80 kJ/m$^2$, more preferably 100 kJ/m$^2$ and most preferably 110 kJ/m$^2$ at +23° C. and at least 100 kJ/m$^2$, more preferably 120 kJ/m$^2$ and most preferably 130 kJ/m$^2$ at −20° C.

The Charpy testing with notched samples according to ISO 179/1eA is in principle the energy absorption which results with a damaged pole, or part, respectively, whereas the Izod testing with unnotched samples according to ISO 180/1U is simulating the bending of an undamaged pole or part, respectively.

Preferably, the olefin material used according to the invention is also resistant to crack initiation and/or crack propagation, preferably measured according to the so-called S4 test (ISO13477, 1997), and have a critical temperature ($T_{crit}$) of 0° C. or below.

The RCP properties can be determined in various ways. According to one method, called the S4 test (Small Scale Steady State), which has been developed at Imperial College, London, and which is described in ISO 13477, a pipe is tested, which has an axial length not below seven pipe diameters. The outer diameter of the pipe is about 110 mm or greater and its wall thickness about 10 mm or greater. When determining the RCP properties of a pipe in connection with the present invention, the outer diameter and the wall thickness have been selected to be 110 mm and 10 mm, respectively. While the exterior of the pipe is at ambient pressure (atmospheric pressure), the pipe is pressurised internally, and the internal pressure in the pipe is kept constant at a positive pressure of normally 0.4 MPa. The pipe is cooled. A number of discs have been mounted on a shaft inside the pipe to prevent decompression during the tests. A knife projectile is shot, with well-defined forms, towards the pipe close to its one end in the so-called initiating zone in order to produce a rapidly running axial crack. The initiating zone is provided with an abutment for avoiding unnecessary deformation of the pipe. The test equipment is adjusted in such manner that crack initiation takes place in the material involved and a number of tests are effected at varying temperatures. The axial crack length in the measuring zone, having a total length of 4.5 diameters, is measured for each test and is plotted against the measured temperature. If the crack length exceeds 4 diameters, the crack is assessed to propagate. If the pipe passes the test at a given temperature, the temperature is lowered successively until a temperature is reached, at which the pipe no longer passes the test, but the crack propagation exceeds 4 times the pipe diameter. The critical temperature ($T_{crit}$) is the lowest temperature at which the pipe passes the test. The lower the critical temperature the better, since it results in an extension of the applicability of the pipe. It is desirable for the critical temperature to be +20° C. or lower, preferably below +10° C., more preferably below 0° C., and in particular below −5° C., more preferred below −10° C. and most preferred below −15° C.

To be specifically noted the poles should not bend too much and not crack during collision in order to keep the vehicle on the road, but should absorb as much energy as possible to avoid injuries of the passengers or severe damages of the car. But, if a notch or the like damage is in the pole, and a crack running during collision the poles according to the invention have still as much energy absorption and as ductile failure as possible.

The polyolefin plastic material is preferably selected from polyethylene and polypropylene plastic.

By polyethylene plastic a plastic is meant based on polyethylene or on co-polymers of ethylene in which the ethylene monomer constitutes the major part of the mass. Polyethylene plastic may thus consist of homo-polymers or co-polymers of ethylene in which case the co-polymers can be graft co-polymers or co-polymers of ethylene and one or more other monomers co-polymerizable with ethylene. The ethylene plastic can be of low pressure type (HDPE, MDPE, LLDPE), i.e. produced by using a co-ordination catalyst at low pressure. Similarly, by polypropylene plastic a plastic is meant based on polypropylene or on co-polymers of propylene, the propylene monomer constituting the major part of the mass. The polypropylene plastic may thus consist of homo-polymers or co-polymers of polypropylene, in which case the co-polymers can be graft co-polymers or co-polymers of propylene and one or more other monomers co-polymerizable with propylene.

As polyolefin material monomodal polyethylene can be used. A particularly preferred material is bi- or multimodal ethylene polymer or copolymer, i.e. a polymer or copolymer the molecular weight distribution curve of which has two or more peaks or maxima. The low molecular weight ethylene polymer or copolymer forming one component of the final bimodal polymer preferably has a weight average molecular weight of between 3,000 and 80,000 g/mol, and the high molecular weight ethylene polymer or co-polymer forming the other component a weight average molecular weight between 200,000 and 2,000,000 g/mol. The overall composition suitably comprises 5 to 95% of the low molecular weight ethylene polymer or co-polymer and 95 to 5% of the high molecular weight ethylene polymer or copolymer, preferably 30 to 70% of the former and 70 to 30% of the latter.

The bi- or multimodal polyethylene may be produced by blending two or more monomodal polyethylenes having different maxima in their molecular weight distributions. Preferably, the bi- or multimodal polyethylene is obtained by (co)polymerisation in at least two steps, in particular by slurry polymerisation in a loop reactor of a low molecular weight (LMW) ethylene homopolymer fraction, followed by gas-phase polymerisation of a high molecular weight (HMW) ethylene copolymer fraction. WO 00/01765 and WO 00/22040 describe such bi- or multimodal polyethylenes. Preferably the bi- or multimodal polyethylene has a density of 0.930 to 0.965 g/cm$^3$. More preferred is a density range of 0.940 to 0.965 g/cm$^3$ and most preferred is the range 0.950 to 0.960 g/cm$^3$. Depending on whether the multimodal polyethylene is bimodal or has a higher modality the LMW and HMW fractions may comprise only one fraction each to include subfractions, i.e. the LMW may comprise two or more LMW sub-fractions and similarity the HMW fraction may comprise two or more HMW sub-fractions. Preferably, the LMW fraction is an ethylene homopolymer and the HMW fraction is an ethylene copolymer, i.e. it is only the HWM fraction that includes a comonomer. Preferably, the lower limit of the molecular weight range of the HMW fraction is 3500, more preferably 4000, which means that almost all ethylene copolymer molecules in the multimodal polyethylene composition have a molecular weight of at least 3500, preferably at least 4000. More particularly, the weight ratio of the LMW fraction to the HMW fraction should lie in the range (35-55):(65-45), preferably (43-51):(57-49), most preferably (44-50):(56-50). Preferably, the bi- or multimodal polyethylene has a viscosity at a share stress of 2.7 kPa of 260-450 kPa.s; and a share thinning index defined as the ratio of the viscosities at share stresses of 2.7 and 210 kPa, respectively, of 50-150, and a storage modulus at a loss modulus of 5 kPa of ≧3000 Pa. The ethylene copolymer of the HMW fraction is preferably a copolymer of ethylene and a comonomer selected from the group consisting of 1-butene, 1-hexene, 4-methyl-1-pentene and 1-octene, wherein the amount of comonomer is 0.1-2.0 mol % of the multimodal polymer. A particular preferred multimodal polymer is obtained by pre-polymerization in a loop reactor, followed by slurry polymerisation in a loop reactor of a LMW ethylene homopolymer fraction, and gas-phase polymerisation of a HMW ethylene copolymer fraction. In this process the polymerisation pro-catalyst and cocatalyst can be added to the first polymerisation reactor only.

A particularly preferred material is cross-linked polyethylene. It is per se known to cross-link polyolefin plastics, such as ethylene plastic. Such cross-linking can be accomplished in various ways, such as radiation cross-linking, peroxide cross-linking, cross-linking with cross-linkable groups, ionomer cross-linking, or combinations of such procedures. In radiation cross-linking, the cross-linking takes place by the plastic being irradiated with high-energy radiation, while in peroxide cross-linking, the cross-linking takes place by the addition of peroxide compounds which form free radicals. In cross-linking with cross-linkable groups, reactive groups are inserted in the plastic, said groups reacting with each other while developing covalent bonds. A special example of such reactive groups are silane groups, which are inserted in the plastic by graft polymerisation or, preferably, copolymerisation and, in the presence of water and a silanol condensation catalyst, are hydrolysed while separating alcohol and forming silanol groups, which then react with each other by a condensation reaction while separating water. In ionomer cross-linking, the plastic contains ionisable groups, which react with polyvalent, ionic cross-linking reagents while developing ionic bonds.

In particular, silane-cross-linking can be performed by grafting different amounts of vinyl trimethoxy silane. Peroxide cross-linking is obtained for instance by adding to the material different amounts of dicumyl peroxide. Radiation cross-linking can be obtained by irradiating the material with beta radiation.

The invention is not limited to a special type of cross-linking, but any suitable process which results in cross-linking of the polyolefin plastic material can be used.

Another preferred material according to the invention is beta nucleated polypropylene. i.e. polypropylene can crystallize in several morphological forms. Under special conditions and in presence of a special nucleating agents polypropylene crystallises in a hexagonal beta-form. This propylene is called beta nucleated polypropylene. The beta-form of isotactic polypropylene as a hexagonal unit cell structure and exhibits negative birefringence. The presence of the beta-form can be detected through the use of wide angle X-ray diffraction (Moore J., Polypropylene Handbook, p. 134-135, Hanser Publishers, Munich 1996). As nucleating agents for crystallising polypropylene in the beta-form, for example quinacridone, pimelic acid calcium salt and calcium stearate can be used.

With plastic road safety systems parts according to the invention made of ductile, energy absorbing material, the absorption will be taken care of to a large extent by the poles (or the whole safety barrier system), giving less damages on the vehicle/persons, and if totally bent to the ground in case of high speed or to heavy vehicles the speed will be reduced significantly without to much damages on the vehicles/persons. This applies also to other road restraint systems and traffic guide poles in accordance with the invention.

The poles or parts, respectively, according to the invention are produced in a manner known per se by, for instance, compression or injection molding or extrusion. The pole can be hollow, that is in form of a pipe, or consist of a solid rod. The poles can also have structured walls or a ribbed design, as axially extending ribs or rings, to improve the utilisation of the material compared to a smooth solid wall pipe.

The pipe can have an outer diameter between 100 and 200 mm for instance, the wall thickness of the pipe may vary between 5 and 20 mm or even up to 50 mm or larger. The pipe may be filled with foamed plastics, preferably foamed polyethylene or polypropylene, for example in order to prevent the pipe from being filled with water and ice during winter time.

Figure 4:
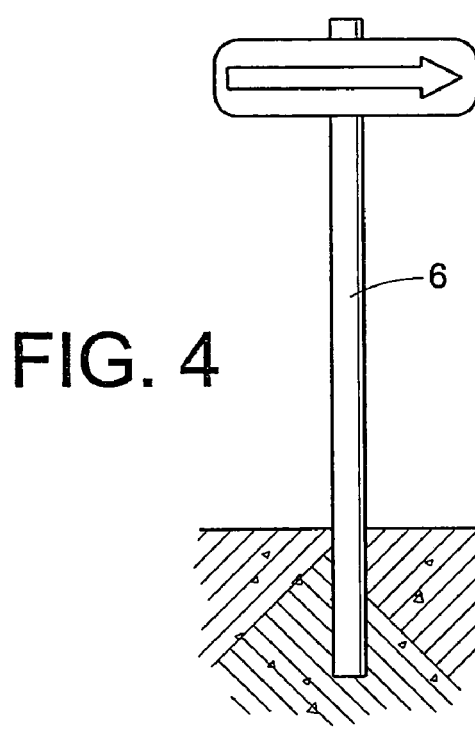
FIG. 4 is a side view of a traffic guide pole.
Figure 3:
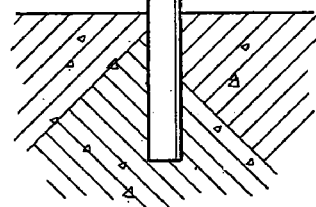
FIG. 3 is a perspective view of a guard rail for a road safety barrier.

With reference to FIG. 4, the invention also comprises traffic guide poles 6. Preferred dimensions of traffic guide poles 6 are: from 20 mm up to 250 mm in diameter and from 0.5 to 1 mm wall thickness up to 20 mm, excluding a foam layer which also could be used to fill the pole completely as already discussed. The shape could be round or some other shape based an a hollow profile or U-profile etc.

Figure 2:
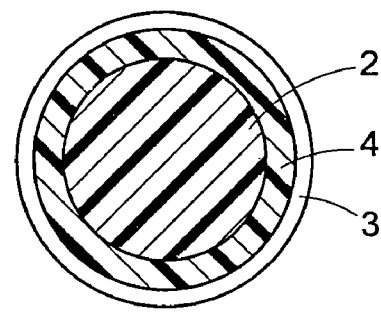
FIG. 2 is a cross-section of the road pole taken along the line II-II in FIG. 1 showing a core of recycled plastic material, a layer of polyethylene plastic, and an outer layer protecting against ultraviolet degradation.

Although the pole or part (such as pole 1 or guide pole 6), respectively, may be made by a single polyolefin, with reference to FIG. 2, poles with two layers or a multi-layer structure are preferred. At least one of these layers 4 being a polyolefin material, preferably a bi- or multi-modal polyethylene, a cross-linked polyethylene, and/or a beta nucleated polypropylene as stated above.

The other material 2 of the multi-structure may be a recycled plastic material, for instance, particularly in the core or as an inner or intermediate layer.

Preferably, the multi-layer structure consists of at least two layers of different polyolefin materials. It can be made by co-extrusion, for instance.

Preferably the pole or part, respectively, comprises two layers of different polymers, an outer layer of polyethylene plastic and an inner layer of polypropylene particularly of a polypropylene block copolymer with a stiffness measured according to ISO 527 (cross head speed 1 mm/min and 23° C.) of 1500 MPa or more or crosslinked polypropylene. Also preferred as inner layers are bi- or multimodal polyethylene or crosslinked polyethylene. The outer layer contains preferably carbon black and/or titanium dioxide for UV-protection and eventually grey colour.

The polyolefin can, of course, also contain fluorescent pigments or pigments of any other colour. Fluorescent pigments may be used particularly for guiding poles made according to the invention. It should be noted, however, that a single layer pole made of polyethylene or crosslinked polyethylene or polypropylene has basically the same properties combined in one layer. The pole or part, respectively, can also be built up of more than two polyolefin layers, such as three or more layers. Most preferred, with continued reference to FIG. 2, is that the pole or part, respectively, is built up of three layers, such as an inner layer 2 of polyethylene plastic, an intermediate layer of polypropylene plastic 4, and an outer layer of polyethylene plastic 3. In addition, a multi-layer structure is preferred with beta nucleated polypropylene for the inner layer, and a bimodal polyethylene for the outer layer. The different polymer layers can be juxtaposed or, if desirable, it is possible to arrange a thin intermediate layer between the polymer layers.

The various layers can have the same or a different thickness. An embodiment of interest in this context is the using of cheap recycled polymer material as one layer and the combining of this with one or more layers having a high energy absorption as stated above.

According to the invention, the brittle nature of plastic-based road restraint system parts, in particular poles for road safety barriers at sub-zero temperatures and/or high impact speeds (crack speeds) is greatly reduced. The poles or parts, respectively, according to the invention involve lower overall costs, are not harmful to the environment, including recyclability, and have a long-expected lifetime. Most important, however, is their high energy absorption potential especially at high impact speed and/or low temperatures.

To increase their expected lifetime the poles or parts, respectively, contain preferably substances against UV-degradation. For instance, the polyolefin material may be filled with carbon black and/or titanium dioxide. When carbon black is used only the polyolefin material is filled with 0,001 to 10 weight %, particularly 1 to 3 weight % carbon black, and when titanium dioxide is used only the polyolefin material is filled with 0.05 to 10 weight %, particularly 2 to 5 weight % titanium dioxid.

Carbon black and titanium dioxide can also be used in combination, for instance both in an amount of 0.1 to 10 weight %, based on the weight of the polyolefin material.

Preferably the polyolefin material contains additionally UV-absorbers on the bases of the derivatives of benzophenone, hydroxybenzoate, benzotriazole and phenol and/or UV-stabilisers, in particular hindered amine light stabilisers (HALS).

Preferred UV-absorbers are listed in table 1, preferred monomeric HALS in table 2 and preferred oligomeric HALS in table 3.

TABLE 1

UV-absorbers

| | | | |
|---|---|---|---|
| Chimassorb | 81 | (1843-05-6)* | 2-hydroxy-4n-octoxy-benzophenone |
| Tinuvin | 120 | (4221-80-1) | 2.4-di-t-butylphenyl-3.5-di-t-butyl-4-hydroxy benzoate |
| Cyasorb | UV 2908 | (67845-93-6) | n-hexadecyl-3,5-di-t-butyl-4-hydroxybenzoate |
| Tinuvin | 326 | (3896-11-5) | 2-(3'-t-butyl-5'-methyl-2'-hydroxyphenyl)-5-chlorobenzotriazole |
| Tinuvin | 327 | (3864-99-1) | 2-(3',5'-di-t-butyl-2'-hydroxyphenyl)-5-chlorobenzotriazole |
| Tinuvin | 328 | (25973-55-1) | 2-(3,5'-di-1,1-dimethylpropyl-2'-hydroxyphenyl)-benzotriazole |
| Tinuvin | 329 | (3147-75-9) | 2-(2'-hydroxy-5'-t-octylphenyl) benzotriazole |
| Cyasorb | UV-1164 | (2725-22-6) | 2-[4,6-bis(2,4-dimethylphenyl)-1,3,5-triazin-2-yl]-5-(octyloxy) phenol |

*Cas No.

TABLE 2 monomeric HALS

Tinuvin 765 (41556-26-7) bis-1,2,2,6,6-pentamethyl-4-pipridyl sebacate
Tinuvin 770 (52829-07-9) bis-(2,2,6,6-tetramethyl-4-piperidyl)-sebacate
Dastib 845 (86403-32-9, 16078-06-0) a mixture of esters of 2,2,6,6-tetramethyl-4-piperidinol and higher fatty acids (mainly stearic acid)
ADK STAB LA-52 (91788-83-9) tetrakis (1,2,2,6,6-pentamethyl-4-piperidyl)-1,2,3,4-butane tetracarboxylate
ADK STAB LA-57 (64022-61-3) tetrakis (2,2,6,6-tetramethyl-4-piperidyl)-1,2,3,4-butane tetracarboxylate
ADK STAB LA-62 (101544-98-3, 84696-72-0) 1,2,2,6,6-pentamethyl-4-piperidyl/tridecyl-1,2,3,4-butane-tetracarboxylate
ADK STAB LA-67 (84696-71-9, 10 1544-99-4)

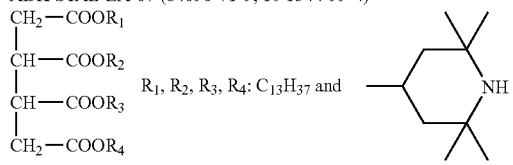

$R_1, R_2, R_3, R_4: C_{13}H_{37}$ and

Hostavin N 20 (6433 8-16-5) 2,2,4,4-tetramethyl-7-oxa-3,20-diaza-dispiro(5.1.11.2)-heneicosane-21-on
Sanduvor PR-31 (94274-03-0) propanedioic, ((4-methoxyphenyl-methylene), bis(1,2,2,6,6-pentamethyl-4-piperidinyl)ester
Uvinul 4050 H (12172-53-8) N,N'-bis(2,2,6,6-tetramethyl-4-piperidyl)-N,N'-hexamethylenebis(formamide)
Good-rite UV 3034 (71029-1 6-8) 1,1'-(1,2-ethanediyl)bis(3,3,5,5-tetramethylpiperazinone)
Good-rite UV 3150 (96204-36-3) 1,1',1''-(1,3,5-triazine-2,4,6-triyltris(cyclohexylimino)-2,1-ethanediyl) tris(3,3,4,5,5-pentamethylpiperazinone)
Good-rite UV 3159 (130277-45-1) 1,1',1''-(1,3,5-triazine-2,4,6-triyltris((cyclohexylimino)-2,1-ethanediyl) tris(3,3,4,5,5-pentamethylpiperazinone)
Chimassorb 119 (106990-43-6) 1,3,5-Triazine-2,4,6-triamine,N,N''-(1,2-ethane-diylbis(((4,6-bis(butyl(1,2,2,6,6-pentamethyl-4-piperidinyl)amino)-1,3,5-triazine-2-yl) imino)-3,1-propanediyl))-bis-(N',N''-dibutyl-N',N''-bis-(1,2,2,6,6-pentamethyl-4-piperidinyl)-
Tinuvin 123 (129757-67-1) bis-(1-octyloxy-2,2,6,6-tetramethyl-4-piperidinyl) sebacate
Chimassorb 966 (86168-95-8) 2,9,11,13,15,22,24,26,27,28,-decaaazatricyclo(21.3.1.110.14)octacosa-1(27),10,12,14(28),23,25-hexaene-12,25-diamine, N,N'-bis(1,1,3,3-tetramethylbutyl)-2,9,15,22-tetrakis(2,2,6,6-tetramethyl-4-piperidinyl)-
Sanol LS-2626 (73754-27-5) 4-(3-)3,5-di-t-butyl-4-hydroxyphenyl)propionyloxy-1-(2-(3-(3,5-di-t-butyl-4-hydroxy)propionyloxy) ethyl)-)-2,2,6,6-tetramethylpiperidine
Flamstab NOR 116 (191680-81-6)

TABLE 2-continued monomeric HALS

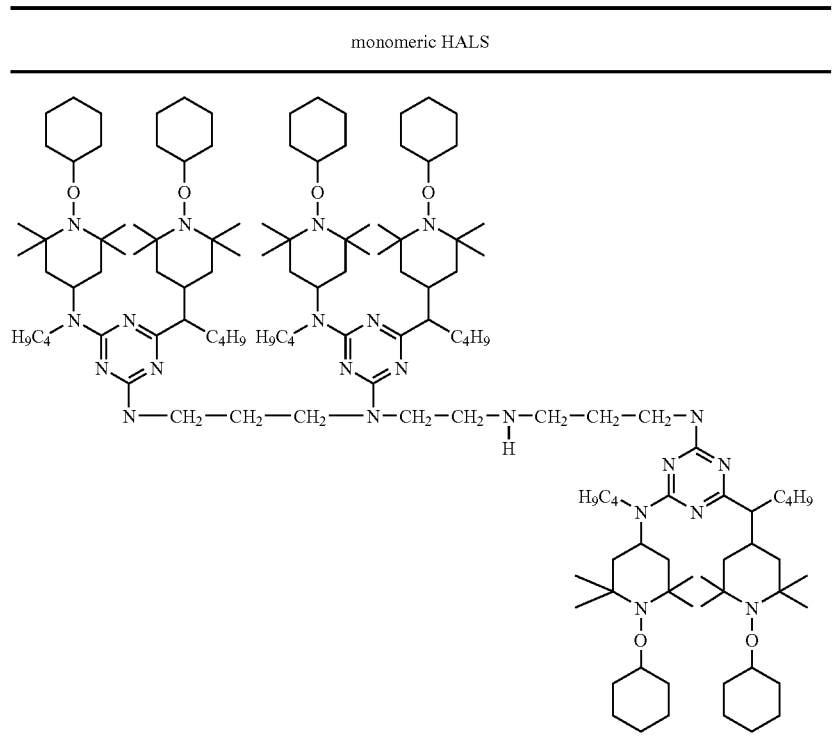

TABLE 3 oligomeric HALS

Tinuvin 622 (65447-77-0) dimethyl succinate polymer with 4-hydroxy-2,2,6,6-tetramethyl-1-piperidine ethanol
Chimassorb 944 (71878-19-8) Poly((6-((1,1,3,3-tetramethylbutyl)amino)-1,3,5-triazine-2,4-diyl)(2,2,6,6-tetramethyl-4-piperidyl)imino)-1,6,hexanediyl((2,2,6,6-tetramethyl-4-piperidyl)imino))-
Chimassorb 2020 (192268-64-7) 1,6-hexanediamine, N,N'-bis(2,2,6,6-tetramethyl-4-piperidinyl)-, polymer with 2,4,6-trichloro-1,3,5-triazine, reactionprodukt with N-butyl-1-butanamine and N-butyl-2,2,6,6-tetramethyl-4-piperidinamie
Cyasorb UV-3346 (82451-48-7) poly((6-morpholino-s-triazine-2,4-diyl)(2,2,6,6-tetramethyl-4-piperidyl)imino)hexamethylene(2,2,6,6-tetramethyl-4-piperidyl)imino))
Cyasorb UV-3529 (193098-40-7) poly((6-morpholino-s-triazine-2,4-diyl)(1,2,2,6,6-pentamethyl-4-piperidyl)imino)hexaethylene (1,2,2,6,6-pentamethyl-4-piperidyl)imino))
UV-Chek AM-806 (115340-81-3)

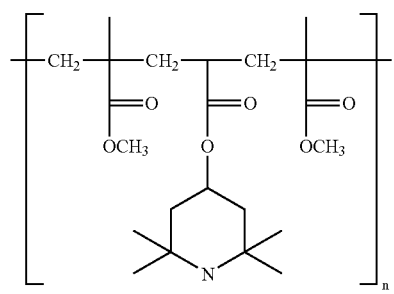

Hostavin N 30 (202483-55-4) Polymer of 2,2,4,4-tetxamethyl-7-oxa-3,20-diaza-20-(2,3-epoxi-propyl)-dispiro-(5.1.11.2)-heneicosane-21-one
Uvasorb HA 88 (136504-96-6) 1,3-propanediamine,N,N''-1,2-ethanediylbis-,polymer with 2,4,6-trichloro-1,3,5-triazine, reaction products with N-butyl-2,2,6,6-tetramethyl-4-piperidinamine
ADK STAB LA-63 (101357-36-2)

TABLE 3-continued oligomeric HALS

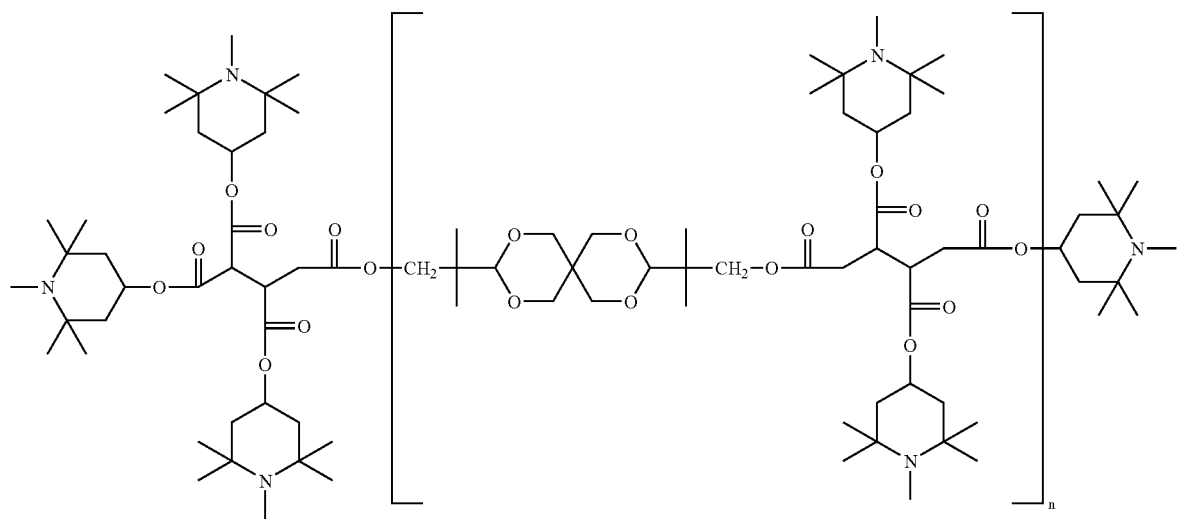

ADK STAB LA-68 (101357-37-3)

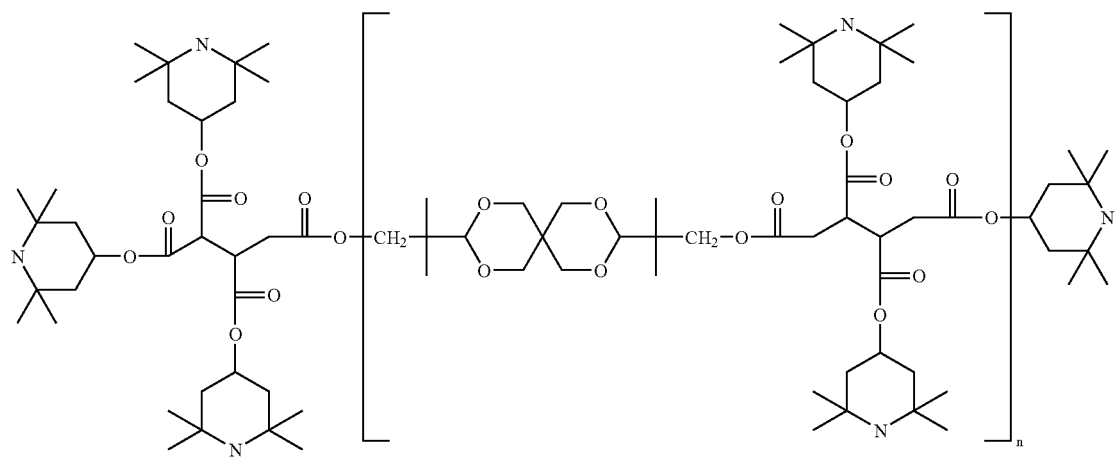

Uvasil 299 LM (102089-33-8, 164648-93-5) Polymethylpropyl-3-oxy-4(2,2,6,6-tetramethyl)piperidinyl)siloxane; $M_w$ 1100-1300
Uvasil 299 HM (102089-33-8, 164648-93-5) Polymethylpropyl-3-oxy-4(2,2,6,6-tetramethyl)piperidinyl)siloxane, $M_w$ 1800-2800
Uvinul 5050 H (152261-33-1) N-(2,2,6,6-tetramethyl-4-piperidyl)-maleinimid, C20:C24-olefin-copolymer These UV-stabilisers and UV-absorbers can be used in combination with carbon black and titanium dioxide. The amount of the HALS stabilisers ranges typically between 0.1 and 3 weight %. When carbon black is used it may be benefitial to use up to 2 weight % of HALS, in particular 0.1 to 0.5 weight %, based on the weight of the polyolefin material.

When the parts or poles, respectively, consist of polypropylene material a strong UV-stabiliser as carbon black, for instance 1 to 5 weight % by weight carbon black, or a mixture of carbon black and titanium dioxide, for instance 1 to 5 weight % carbon black and 3 to 10 weight % titanium dioxide are necessary in order to be able to withstand decades of sun exposure.

When carbon black is used, the preferred combination is monomer and oligomer HALS:

A) Monomer HALS

Tinuvin 770 or 123

Dastib 845

ADK-STAB LA-52

Hostavin N20

B) Oligomer HALS

Tinuvin 622, Chimassorb 944 or 2020, Hostavin N 30, Cyasorb UV 3346

In a multi-layer structure the above UV-stabilisers and UW-absorbers are preferably applied in the above mentioned amounts to the outer layer, which consists preferably of a polyethylene material.

In a multi-layer structure the outer layer may also contain 0.1 to 0.5 weight % monomer HALS and 0.4 to 4 weight % oligomer HALS, based on the weight of the polyolefin material.

When a solid pipe is used for the poles or parts, respectively, the monomer HALS content may be 0.1 to 0.5 weight %, and the oligomer HALS contain 0.2 to 1 weight %, based on the weight of the polyolefin material.

The grey colouring is cosmetic to give the pole or part, respectively, the colour of a metal. Furthermore, for marking and/or safety purposes the pole or its outer layer may contain fluorescent or colour pigments in combination with UV-absorbers and UV-stabilisers.

In order to avoid bending of the poles or parts, respectively, due to temperature differences between their sunny and shady side, a white or light colour may be preferred, that is in a multi-layer structure a white or light coloured outer layer. A grey colour can be obtained by filling the polyolefin material with a mixture of carbon black and titanium dioxide, the white colour may be obtained by using titanium dioxide only.

The road restraint system parts of the present invention are particularly road poles for road safety barriers of various design. For instance, with reference to FIG. 5, the road safety barrier can be based on poles to which metal bars, rails, wires, and the like 5, particularly of steel or aluminium, are connected.

However, the present invention covers also poles for terminals, that is the end treatment of a safety barrier. The terminal can be placed both at the upstream and at the downstream end of a safety barrier.

However, besides poles the road restraint system can comprise other parts in accordance with the invention as well, for instance guard rails 5 and the like. That is, guard rails made of steel but also guard rails made of polyolefin according to the invention can be fastened to poles in accordance with the invention. Other road restrain or safety system parts made according to the invention are traffic guide poles both those for temporary use (long with a small diameter) during winter time for guiding and making it easier to clean the road from snow and those used along side the road during the whole year, both preferably equipped with a reflector or the like. Since parts of a vehicle body, as bumpers, bumper suspensions, fenders, the hood and the like, require basically the same properties as road restrain or safety system parts the polyolefin material defined in the claims can also be used for vehicle body parts. Accordingly, the invention comprises parts of a vehicle body as well.

In the following examples the impact strength of the polyolefin materials are determined according to the Charpy impact strength test with notched specimen (ISO 179/1eA) and according to the Izod impact strength test with unnotched specimen (ISO 180/1U).

EXAMPLE 1 TO 4

1) HE 3490 LS, a bimodal polyethylene (produced according to WO 00/22040)
2) HE 2558, a peroxide cross-linked polyethylene, crosslinking level 80% (DIN 16892)
3) BEC 5012, a beta nucleated block copolymer of polypropylene
4) Hostalen (CRP100), a bimodal polyethylene ("Hostalen" is a registered trademark)

EXAMPLES 5 AND 6

Comparison

5) HE 2467 BL, monomodal polyethylene
6) BA 202 E, a polypropylene block copolymer The impact strength values of the polyolefin materials according to examples 1 to 4 and the comparative examples 5 and 6 are shown in the table 4 below.

As shown in table 4 it is also beneficial to use material with highest stiffness/elastic modulus, as long as the energy absorption potential is sufficient. The higher the elastic modulus the better is the utilisation of the material, i.e. the less material is needed.

TABLE 4

| | | | | | | | | | |
|---|---|---|---|---|---|---|---|---|---|
| | | | | Impact test results | | | | | |
| Example<br>Product | 1)<br>HDPE<br>HE3490LS | | 2)<br>PEX-A<br>HE2558 | 3)<br>PP<br>BEC5012<br>beta-PPb | 4)<br>HDPE<br>Hostalen<br>CRP100 | 5)<br>HDPE<br>HE2467BL | | 6)<br>PP<br>BA202 | |
| Charpy, notched, kJ/m² ISO 179 | CM | Pipe | | IM | CM | CM | CM | IM | Pipe |
| 23° C. | 22 | | 35 | 105 | 22 | 7, 2 | 48 | 35 | 16 |
| 0° C. | 16 | | 27 | 53 | 17 | — | 9 | — | 6, 8 |
| −10° C. | — | | — | — | — | — | 5, 6 | — | 3, 8 |
| −20° C. | 7, 0 | | 21 | 18 | — | 2, 7 | — | 4, 4 | — |
| −30° C. | 7, 2 | | | | 5, 4 | 3, 5 | | | |
| Izod, unnotched, kJ/m² ISO 180 | CM | | CM | CM | CM | CM | CM | | |
| 23° C. | 109 NB | | 92 NB | 92 NB | 106 NB | 100 NB | | 125 NB | |
| 0° C. | 122 NB | | 88 NB | 151 NB | 123 NB | 122 NB | | 129 NB | |
| −20° C. | 133 NB | | 111 NB | 123 NB | 125 NB | 129 NB | | 65 C/H | |
| −30° C. | 145 NB | | — | — | 140 NB | | | | |
| E-modulus[1] (MPa) | 1100 | | 600 | 1150 | 1100 | 800 | | 1300 | |

TABLE 4-continued

| | | | Impact test results | | | |
|---|---|---|---|---|---|---|
| Example Product | 1) HDPE HE3490LS | 2) PEX-A HE2558 | 3) PP BEC5012 beta-PPb | 4) HDPE Hostalen CRP100 | 5) HDPE HE2467BL | 6) PP BA202 |
| Density (g/cm³)²⁾ | 0.949 | 0.938³⁾ | 0.900 | 0.949 | 0.943 | 0.900 |
| $T_{crit}$ (° C.)⁴⁾ | −12 | <−20 | −8 | −17 | +23 | >+23 |

CM = Compression moulded specimens
IM = Injection moulded specimens
Pipe = Extruded pipes
NB = Non breaK
C = complete break
H = hinge break (incomplete break)
[1]according to ISO 527 (crosshead speed 1 mm/min and 23° C.)
[2]according to ISO 1183/ISO 1872-2B
[3]density 0.956 g/cm³ (before crosslinking)
[4]test pressure 0.4 MPa The Charpy testing with notched samples is in principle the energy absorption of a damaged pole, the notches simulating damages in the poles before a collision, for instance during cleaning of the roads from snow during wintertime or based on damages made during the collision. It can be seen that the polyolefin material of examples 1 to 4 according to the present invention show a large difference in the Charpy testing compared with the polyolefin materials of comparative examples 5 and 6.

Since such damages are unavoidable during the lifetime of a pole of a road safety barrier the gist of the invention is to use polyolefin materials with high Charpy impact strength values also at low temperatures. In contrast to that, the Izod impact strength values of the polyolefin material used according to the invention does not vary much from the comparative examples 5 and 6.

EXAMPLE 7

Impact Test of Road Poles According to the Invention

Poles extruded of bimodal polyethylene HE 3490 LS (produced according to WO 00/22040) were tested in accordance with European standard EN 1317-2:1998, the so-called N2 test which comprises an impact test based on 2 vehicles of different weight and different speed.

The poles had a total length of 2 m. They consisted of pipes having an outer diameter of 160 mm and a wall thickness of 16 mm.

At a testing site a barrier was installed consisting of a guard rail of 76 m length with poles at 4 m distances. Each longitudinal member was 4 m of length. In beginning and end of the guard rail was a guard rail dipped into ground on a distance of 12 m, consisting of 7 poles at 2.0 m distance. This gives a total guard rail length, including start and end of guard rail, of 100 m. The height of longitudinal W-member was 306 mm and mounted so that the center line of W-member was positioned at 0.6 m from ground. The W-profile is made of a steel sheet having a thickness of 3 mm. The guard-rail was installed at an angle of 20° in respect of pre-impacted test track rail. The impact point was 14.5 m from upstream full height point. The poles had a total length of 2 m, 1 m above ground and 1 m below ground. All test have been performed between 4° C. and 5° C.

Impact speed: 101 km/h (Ford Fiesta, total test mass 922 kg) and 114 km/h (Volvo, total test mass 1432 kg) with an impact angle of 20 degrees.

Results: The cars run on the road before, during and after the impact event. The contact length was 20.4 m (Ford Fiesta) and 21 m (Volvo), respectively. The cars did not show any damages which could be regarded as dangerous to the driver or passengers. Even the wind shields did not break. The cars did pass the requirements according to EN1317-1 including key items such as:

| | Ford Fiesta, 922 kg | Volvo, 1432 kg |
|---|---|---|
| Impact speed | 101 km/h | 114 km/h |
| ASI value | 0.63 | 0.5 (acceleration severity index) |
| W | 5 | 7 |
| Stop length | 20.4 m | 21 m |
| Within exit box | yes | yes |

The following questions are related to chapter 9 in the European standard NS-EN 1317-1.
Vehicle breaches barrier? No.
Vehicle passes over the barrier? No.
Vehicle within the "box"? Yes.
Vehicle rolls over within test area? No.
Major parts of vehicle detached? No.

The invention claimed is:

1. A road restraint system part, consisting essentially of:
   a polyolefin material selected from at least one of a polyethylene plastic that is bi- or multimodal polyethylene, a polyethylene plastic that is a cross-linked polyethylene, and a polypropylene plastic that is beta-nucleated polypropylene, characterised in that the polyolefin material has an energy absorption of at least 10 kJ/m² at +23° C. and at least 5 kJ/m² at −20° C. as determined according to ISO 179/1eA with notched specimens.

2. A part according to claim 1, characterised in that the polyolefin material is polyethylene plastic that is bi- or multimodal polyethylene.

3. A part according to claim 2, characterised in that the polyethylene plastic is cross-linked polyethylene.

4. A part according to claim 1, characterised in that the polyolefin material is polypropylene plastic that is beta-nucleated polypropylene plastic.

5. A part according to claim 1 having a critical temperature ($T_{crit}$) below +20° C. measured on a pipe having an outer diameter of 110 mm and a wall thickness of 10 mm.

6. A part according to claim 1, further comprising at least two layers, at least one of the two layers being the polyolefin material.

7. A part according to claim 6, characterised in that the at least two layers are formed of different polyolefin materials.

8. A part according to claim 1, characterised in that the polyolefin material forms a road pole.

9. A part according to claim 5, wherein the critical temperature ($T_{crit}$) is below +5° C.

10. A road restraint system part, consisting essentially of:
a polyolefin material selected from at least one of a polyethylene plastic that is bi- or multimodal polyethylene, a polyethylene plastic that is a cross-linked polyethylene, and a polypropylene plastic that is beta-nucleated polypropylene, wherein the polyolefin material has an energy absorption of at least 10 kJ/m² at +23° C. and at least 5 kJ/m² at −20° C.

11. The road restraint system part of claim 10, wherein the polyolefin material is polyethylene plastic that is bi- or multimodal polyethylene.

12. The road restraint system part of claim 11, wherein the polyethylene plastic is cross-linked polyethylene.

13. The road restraint system part of claim 10, wherein the polyolefin material is polypropylene plastic that is beta-nucleated polypropylene plastic.

14. The road restraint system part of claim 10, wherein the polyolefin material has a critical temperature below about +20° C.

15. The road restraint system part of claim 14, wherein the critical temperature is below about +5° C.

16. The road restraint system part of claim 15, where the critical temperature is below about 0° C.

17. The road restraint system part of claim 16, wherein the critical temperature is below about −15° C.

18. The road restraint system part of claim 10 further comprising at least two layers, at least one of the two layers being the polyolefin material.

19. The road restraint system part of claim 18, wherein the at least two layers are formed of different polyolefin materials.

20. The road restraint system part of claim 10, wherein the polyolefin material forms a road pole.

21. A part according to claim 9, wherein the critical temperature ($T_{crit}$) is below 0° C.

22. A part according to claim 21, wherein the critical temperature ($T_{crit}$) is below −15° C.

* * * * *